(12) United States Patent
Tao et al.

(10) Patent No.: US 12,337,488 B1
(45) Date of Patent: Jun. 24, 2025

(54) METHODS FOR IMPROVED HAND-EYE CALIBRATION BASED ON STRUCTURED LIGHT CAMERAS

(71) Applicant: GUANGDONG UNIVERSITY OF TECHNOLOGY, Guangdong (CN)

(72) Inventors: Jie Tao, Guangzhou (CN); Xinyan Li, Guangzhou (CN); Ankang He, Guangzhou (CN); Zehui Xiao, Guangzhou (CN); Qiang Wei, Guangzhou (CN); Tiangang Luan, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/064,661

(22) Filed: Feb. 26, 2025

(30) Foreign Application Priority Data

Jun. 18, 2024 (CN) .......................... 202410781298.8

(51) Int. Cl.
*B25J 9/16* (2006.01)
(52) U.S. Cl.
CPC ........... *B25J 9/1692* (2013.01); *B25J 9/1697* (2013.01); *G05B 2219/39016* (2013.01); *G05B 2219/39022* (2013.01)
(58) Field of Classification Search
CPC .................. B25J 9/1692; B25J 9/1697; G05B 2219/39011–39013; G05B 2219/39016;
(Continued)

(56) References Cited

U.S. PATENT DOCUMENTS

| 5,280,436 A | * | 1/1994 | Kubota | .................. B25J 9/1697 356/614 |
| 2022/0402131 A1 | * | 12/2022 | Sivanath | ................ B25J 9/1692 |
| 2023/0339112 A1 | | 10/2023 | Chun et al. | |

FOREIGN PATENT DOCUMENTS

| CN | 111775152 A | 10/2020 |
| CN | 114714356 A | 7/2022 |

(Continued)

OTHER PUBLICATIONS

First Office Action in Chinese Application No. 202410781298.8 mailed on Oct. 26, 2024, 17 pages.
(Continued)

*Primary Examiner* — Spencer D Patton
(74) *Attorney, Agent, or Firm* — Porus IP LLC

(57) ABSTRACT

Provided is a method for improved hand-eye calibration method based on a structured light camera. The method includes: step 1: establishing a pinhole camera model, and using a depth camera to detect a three-dimensional (3D) coordinate to obtain a physical coordinate of each point in an image coordinate system with a known depth relative to a camera coordinate system; step 2: establishing a Denavit-Hartenberg (DH) model of a robotic arm, and moving the robotic arm to a determined coordinate using inverse kinematics; step 3: collecting n sets of point cloud data, applying depth scaling coefficients to the n sets of point cloud data to perform Singular Value Decomposition (SVD), and solving for an optimal depth scaling coefficient using a Nelder-Mead algorithm; and step 4: completing the hand-eye calibration of the robotic arm based on the solved optimal depth scaling coefficient. The method offers strong operability and robustness.

5 Claims, 6 Drawing Sheets

(58) Field of Classification Search
CPC ........... G05B 2219/39022; G05B 2219/39024;
G05B 2219/39042; G05B 2219/39387;
G05B 2219/39391; G05B 2219/39394;
G06T 7/70–85; G06T 2207/10028
See application file for complete search history.

(56) References Cited

FOREIGN PATENT DOCUMENTS

| | | |
|---|---|---|
| CN | 115674186 A | 2/2023 |
| CN | 117428772 A | 1/2024 |

OTHER PUBLICATIONS

Notification to Grant Patent Right for Invention in Chinese Application No. 202410781298.8 mailed on Nov. 29, 2024, 4 pages.
Song, Limei et al., Machine Vision and Machine Learning: Algorithmic principles, framework application to code implementation, China Machine Press, 2020, 12 pages.
Shen, Aihua et al., An Approach to Hand-eye Calibration Based on Stereo Vision, Machine Design and Manufacturing Engineering, 45(5): 42-46, 2016.
Xiao, Zehui, Hybrid Trajectory Planning Based on Indoor Visual Positioning System, Chinese Master's Theses Full-text Database, 2023, 76 pages.
Zhang, Qiang et al., Error Distribution Estimation Based Robot Hand-eye Calibration, Computer Measurement & Control, 26(4): 246-249, 2018.

\* cited by examiner

600

In response to hand-eye calibration being completed, obtaining error data of a robotic arm during a task execution period via an image monitoring device — 610

Adjusting the value of n in n sets of point cloud data based on the error data, and issuing a recalibration instruction — 620

FIG. 6

METHODS FOR IMPROVED HAND-EYE CALIBRATION BASED ON STRUCTURED LIGHT CAMERAS

CROSS-REFERENCE TO RELATED APPLICATIONS

This application claims priority to Chinese Patent Application No. 202410781298.8, filed on Jun. 18, 2024, the entire contents of which are hereby incorporated by reference.

TECHNICAL FIELD

The present disclosure relates to the technical field of hand-eye calibration and in particular, relates to a method for improved hand-eye calibration based on a structured light camera.

BACKGROUND

With the increasing level of automation in industrial robots, machine vision has become an essential component of automated processing. When using vision to locate, grasp, and transport a target object, it is necessary to obtain three-dimensional spatial information of the target object through a camera. This process involves hand-eye calibration.

Hand-eye calibration is a technique used to unify coordinate systems of a vision system and a robot, thereby transforming a pose of the object determined by the vision system into the robot's coordinate system, allowing a robotic arm to perform tasks on the object. Common hand-eye systems include two types: an Eye-to-Hand system and an Eye-in-Hand system. In the Eye-to-Hand system, the camera's position is relatively fixed with respect to a robot base, and a hand-eye relationship is used to solve the transformation between a camera coordinate system and a robot base coordinate system. In the Eye-in-Hand system, the camera is fixed at an end effector of the robotic arm, and the hand-eye relationship solves the transformation between the camera coordinate system and a robotic arm end effector coordinate system. When the robot is in different positions and orientations, the relationship between the "eye" and the calibration object is obtained. By combining the robot's pose (which may be read from a robot controller), a calibration equation may be established. Solving this equation yields a hand-eye transformation matrix. However, due to the nonlinearity and instability of the equation-solving process, obtaining a solution with minimal error and meaningful results is a critical issue in hand-eye calibration.

Therefore, the preset disclosure proposes a method for improved hand-eye calibration based on a structured light camera. The method uses Kalman filtering for depth estimation and compensates for structured light camera errors through algorithms and calibration results, ultimately improving the accuracy of hand-eye calibration.

SUMMARY

Some embodiments of the present disclosure provide a method for improved hand-eye calibration based on a structured light camera. By incorporating the Singular Value Decomposition (SVD) process, errors are analyzed, and the optimal solution is obtained using the Nelder-Mead algorithm. For hand-eye calibration based on structured light cameras, some embodiments of the present specification offer advantages such as high operability and strong robustness.

The method for improved hand-eye calibration based on a structured light camera provided in embodiments of the present disclosure may include:

Step 1: establishing a pinhole camera model, and using a depth camera to detect a three-dimensional (3D) coordinate to obtain a physical coordinate of each point in an image coordinate system with a known depth relative to a camera coordinate system.

Step 2: establishing a Denavit-Hartenberg (DH) model of a robotic arm, and moving the robotic arm to a determined coordinate using inverse kinematics.

Step 3: collecting n sets of point cloud data, applying depth scaling coefficients to the n sets of point cloud data to perform Singular Value Decomposition (SVD), and solving for an optimal depth scaling coefficient using a Nelder-Mead algorithm.

In the step 3, the robotic arm is driven using a given set of known joint angles, an end effector $P_{base}^{tool}$ of the robotic arm is obtained using a kinematic model of the robotic arm, an axial difference $p_{tool}^{cal}$ of a checkerboard corner point at a specified position relative to the end effector of the robotic arm is manually measured, and $P_{base}^{tool}$ and $P_{tool}^{cal}$ tool are combined to obtain $P_{base}^{cal}$; the above operation is repeated to obtain a set of point cloud data relative to a base coordinate system of the robotic arm; the depth camera obtains a pixel coordinate of the checkerboard corner point at the specified position relative to the image coordinate system of the depth camera and a depth value of the checkerboard corner point relative to the camera coordinate system through corner detection, the pixel coordinate and the depth value are substituted into the pinhole camera model to obtain a 3D coordinate $p_{camera}^{cal}$ of the checkerboard corner point relative to the depth camera; the above operation is repeated to obtain a set of point clouds relative to the camera coordinate system, depth values of all point cloud data collected by the depth camera are processed through a first-order Kalman filter, and after the depth values measured by the depth camera are filtered and converged, complete point cloud data are calculated using an intrinsic parameter matrix of the depth camera;

In the step 3, the performing SVD includes: de-centering two sets of point cloud data, constructing a covariance matrix based on normalized two sets of point cloud data, decomposing the covariance matrix to obtain a matrix U, a matrix S, and a matrix V, and obtaining a calibration result by determining a rotation matrix R and a translation vector t based on a decomposition result.

Step 3 further includes: analyzing and compensating for axial scaling of a depth of the depth camera; multiplying the depth value obtained by the depth camera by a scaling coefficient, such that the point cloud data of the checkerboard corner point is changed relative to the depth camera, multiplying the point cloud data collected by the depth camera and a mean value of the point cloud data by the scaling coefficient, and according to properties of the SVD, U and V remain unchanged, and S is scaled by a same factor as the covariance matrix:

$$[U \quad S*\text{z\_scale} \quad V] = SVD(H')$$

$$\begin{cases} R = V*U^T \\ t' = \bar{Y} - R\bar{X}*\text{z\_scale} \end{cases}$$

In the step 3, the depth scaling coefficient, denoted as z_scale, is optimized based on the calibration result, and an error function is defined using the scaling coefficient as an independent variable:

$$e(\text{z\_scale}) = P_{base}^{cal} - (R*P_{camera}^{cal} + t');$$

Step 3 further includes: designating a coordinate of a calibration plate relative to the base coordinate system of the robotic arm as a true value, determining a calibration error by subtracting a calculation result of a measured coordinate of the depth camera and the calibration result from the true value, taking the independent variable of the error function as the depth scaling coefficient and combining the above equations to obtain an equation:

$$e(z\_scale)=P_{base}^{cal}-(R*P_{camera}^{cal}*z\_scale+\overline{Y}-R*\overline{X}*z\_scale)$$

Step 3 further includes: determining a relationship between the error function and the depth scaling coefficient based on the combined equation, calculating a magnitude of an error, with an optimization objective being identifying a minimum value of the error; and using the Nelder-Mead algorithm to identify the minimum value and solving for the optimal depth scaling coefficient.

Step 4: completing the hand-eye calibration of the robotic arm based on the solved optimal depth scaling coefficient.

BRIEF DESCRIPTION OF THE DRAWINGS

The present disclosure will be further illustrated by way of exemplary embodiments, which are described in detail with the accompanying drawings. These embodiments are non-limiting. In these embodiments, the same count indicates the same structure, wherein:

FIG. 6 is a flowchart of an exemplary process for performing hand-eye calibration based on adjusted point cloud data according to some embodiments of the present disclosure.

DETAILED DESCRIPTION

Figure 1:
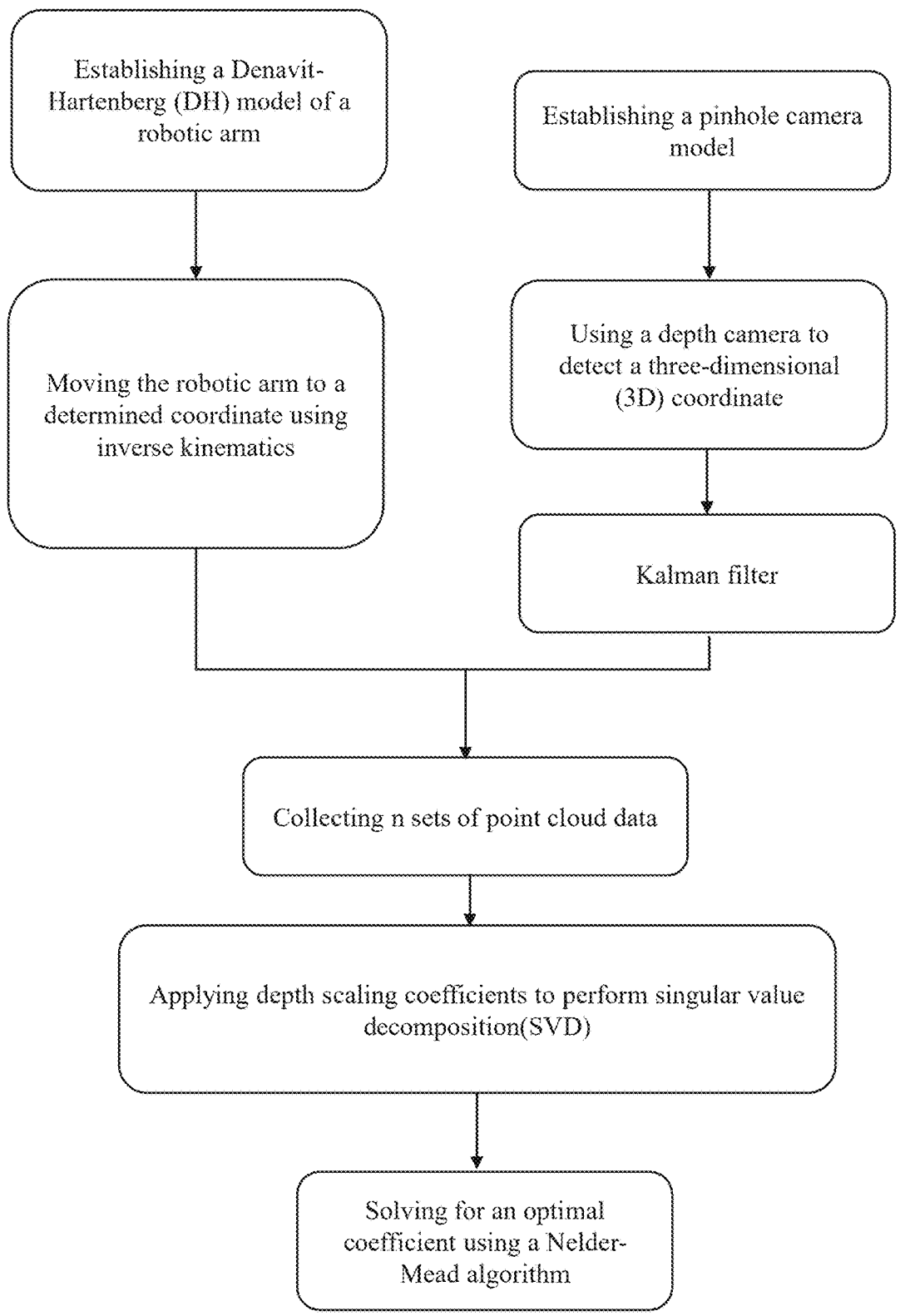
FIG. 1 is a flowchart of an exemplary process of a method for improved hand-eye calibration based on a structured light camera according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

FIG. 1 is a flowchart of an exemplary process of a method for improved hand-eye calibration based on a structured light camera according to some embodiments of the present disclosure. As shown in FIG. 1, process 100 may include the following steps. In some embodiments, process 100 may be implemented by a processor.

In some embodiments, the processor is configured to analyze and process data, and issue control instructions to control other mechanisms to perform corresponding functions. For example, the processor may control a robotic arm to move and/or rotate, and control a depth camera to capture images.

Step 1: establishing a pinhole camera model, and using a depth camera to detect a three-dimensional (3D) coordinate to obtain a physical coordinate of each point in an image coordinate system with a known depth relative to a camera coordinate system.

The pinhole camera model refers to a geometric model configured to describe a process by which a depth camera maps points in 3D space onto a two-dimensional (2D) plane.

The depth camera may be configured to obtain a distance from an object to the camera, as well as a coordinate of each point on the object within a preset 3D coordinate system, and calculate a coordinate of each point on the object within a preset 2D coordinate system. The depth camera may include a structured light camera, or the like. The preset 3D coordinate system may include the camera coordinate system, a camera 3D coordinate system established with a camera origin $O_{lm}$ as a coordinate origin, or the like. The preset 2D coordinate system may include the image coordinate system, an imaging coordinate system, a fixed-depth camera coordinate system, or the like. For example, the image coordinate system may be established with an image origin $O_{pix}$ as a coordinate origin.

In some embodiments, the camera coordinate system may also be referred to as the depth camera coordinate system or the camera 3D coordinate system.

The imaging plane refers to a plane on which the photographed object is imaged after being captured by the camera. The imaging plane may be a preset plane.

In some embodiments, the depth camera may be mounted on a robotic arm. In some embodiments, the depth camera may be mounted on a base of the robotic arm, and a relative position between the depth camera and the base does not change. In some embodiments, the depth camera may be mounted on an end effector of the robotic arm, allowing the depth camera to move synchronously with the end effector of the robotic arm.

Step 2: establishing a Denavit-Hartenberg (DH) model of the robotic arm, and moving the robotic arm to a determined coordinate using inverse kinematics A robot refers to a mechanical structure capable of performing automated or semi-automated tasks.

The robotic arm is a component of the robot. The robot performs tasks such as positioning, grasping, and moving objects through the robotic arm. In some embodiments, the robotic arm may include a plurality of interconnected joints and links. The links may be rigid structures. The joints may include at least one of rotational joints and translational joints. The joints may drive adjacent links to rotate and translate.

The DH model refers to a kinematic model of the robotic arm. The DH model may also be referred to as a robotic arm DH model. The DH model may transform the robotic arm into a model with a plurality of links and joints connected in sequence, thus simulating a motion process of the robotic arm.

The inverse kinematics refers to solving a required rotation angle of each joint based on a pre-set position and orientation of the end effector of the robotic arm, to allow the end effector of the robotic arm to reach a specified position and orientation. In some embodiments, the DH model of the robotic arm and inverse kinematics may be stored in the processor.

The determined coordinate refers to a pre-set position and orientation of the end effector of the robotic arm. In some embodiments, the determined coordinate may include the coordinate of at least one point in the image coordinate system.

Step 3: collecting n sets of point cloud data, applying depth scaling coefficients to the n sets of point cloud data to perform Singular Value Decomposition (SVD), and solving for an optimal depth scaling coefficient using a Nelder-Mead algorithm.

Point cloud data refers to a collection of vectors in a 3D coordinate system, for example, a collection of vectors in the camera coordinate system. In some embodiments, the point cloud data is acquired through the depth camera.

The depth scaling coefficient refers to a coefficient used to reduce or enlarge the depth. In some embodiments, the depth scaling coefficient may be a preset value. In some embodiments, the depth scaling coefficient may also be referred to as a scaling coefficient. By applying the depth scaling coefficient to the depth acquired by the depth camera, systematic errors in depth determination can be eliminated, thereby improving the accuracy of the determined depth.

SVD, also referred to as Singular Value Decomposition, is a matrix factorization technique used to decompose a non-zero m×n real matrix A into a product of three real matrices.

The Nelder-Mead algorithm, also referred to as the Nelder-Mead optimization algorithm, is an algorithm for finding the local minimum of a multivariate function that does not require a function to be differentiable and can converge to a local minimum value relatively quickly. In some embodiments, the SVD and the Nelder-Mead algorithm may be stored in the processor.

The optimal depth scaling coefficient refers to the local minimum value calculated by the Nelder-Mead algorithm.

Figure 3:
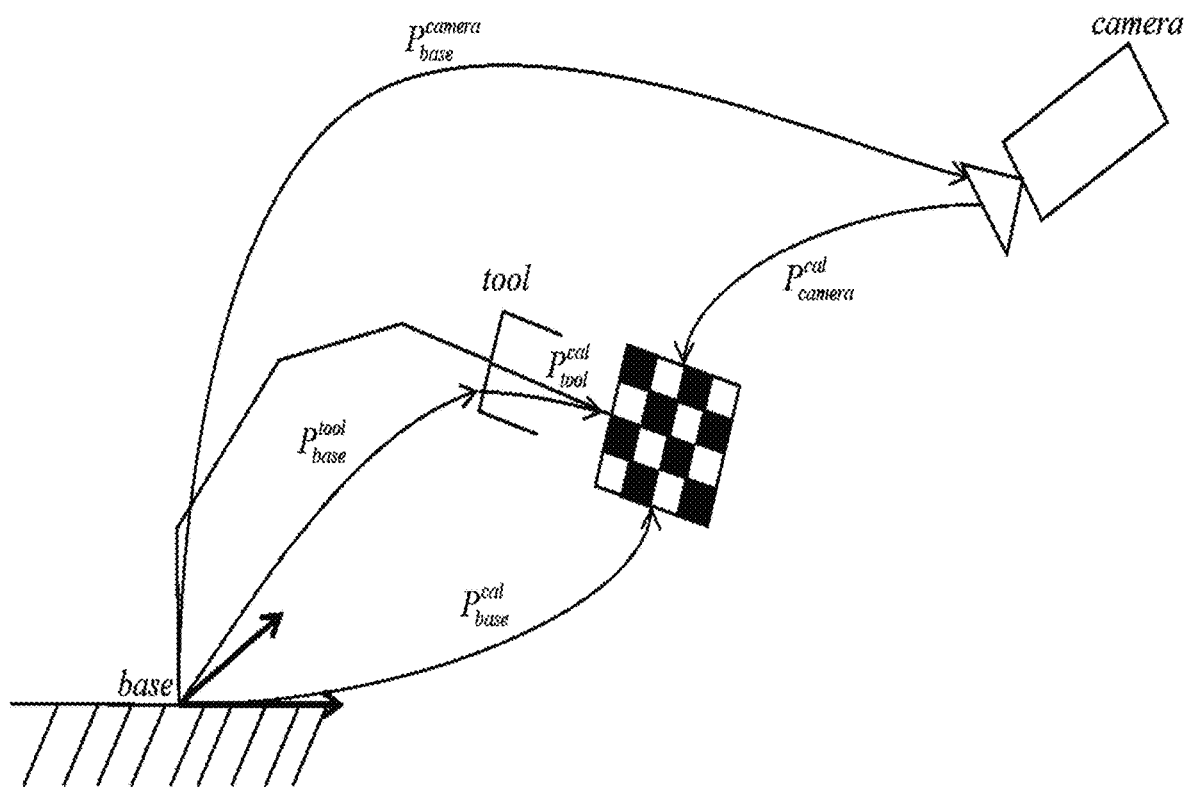
FIG. 3 is a schematic diagram of a hand-eye calibration coordinate system and a transformation relationship according to some embodiments of the present disclosure.

For more details on solving the optimal depth scaling coefficient, please refer to the related description in FIG. 3.

Step 4: completing the hand-eye calibration of the robotic arm based on the solved optimal depth scaling coefficient.

The hand-eye calibration refers to the processor determining a transformation relationship between the coordinate of the end effector of the robotic arm in the image coordinate system and the camera coordinate system. For example, after determining the optimal depth scaling coefficient, the processor determines a product of the depth acquired by the depth camera and the optimal depth scaling coefficient, and then determines the transformation relationship between the image coordinate system and the camera coordinate system based on the product. For more details on the hand-eye calibration, please refer to the related description in FIG. 3.

In some embodiments, the processor acquires coordinate information of a target object through the depth camera, and determines and adjusts a rotation angle of at least one joint of the robotic arm through coordinate transformation. Based on the rotation angle, the processor controls the robotic arm to move and reach an expected position and an expected orientation.

The target object refers to an object that the robot needs to locate, grasp, or transport, such as goods, containers, etc.

The coordinate information of the target object may include a coordinate value of at least one point on the target object in the camera coordinate system, a robotic arm base coordinate system, etc. The robotic arm base coordinate system may also be referred to as the base coordinate system of the robotic arm.

The coordinate transformation refers to converting the coordinate values of at least one point projected in different coordinate systems. For example, coordinate transformation includes determining a transformation relationship between the coordinates of at least one point on the target object in the camera coordinate system and the base coordinate system based on hand-eye calibration. In some embodiments, after completing the hand-eye calibration, the processor may determine a pose of the target object in the base coordinate system, ensuring that the target object and the robotic arm are in a same base coordinate system, thereby determining the expected position and the expected orientation of the robotic arm when performing tasks, for example, the position and the orientation required for the robotic arm to grasp the target object.

The expected position refers to a position that the end effector of the robotic arm is expected to reach after adjustment, such as a center of the target object, an edge of the target object, or the like. In some embodiments, the expected position may include a relative position between the end effector of the robotic arm and the target object. The expected position is a preset value and may be determined according to actual needs.

The expected orientation refers to a shape that the robotic arm is expected to achieve after adjustment. For example, the joints move or rotate to expected positions, and the joints drive the links to move or rotate to expected positions, so that the shape of the robotic arm meets expectations. The expected orientation is a preset value and may be determined according to actual needs.

The base coordinate system refers to a coordinate system constructed based on the robotic arm, for example, a coordinate system established with the base of the robotic arm as an origin, or the like. The base coordinate system may also be referred to as the robotic arm base coordinate system, a robot coordinate system, etc.

The rotation angle refers to an angle by which at least one joint of the robotic arm rotates around a rotation center of the joint. The at least one joint may drive the robotic arm to rotate by a same angle.

In some embodiments, the processor may determine the rotation angle of the at least one joint of the robotic arm through various manners based on the expected position and the expected orientation, such as using the robotic arm DH model. For more details on the robotic arm DH model, please refer to the related description in Step 2.

In some embodiments, after the processor controls the robotic arm to move to the expected position and the expected orientation, the processor may further control the robotic arm to grasp the target object.

In some embodiments, the processor may generate an estimated range of motion for the end effector of the robotic arm based on an item type, an item size, and a task type of the target object; generate at least one target scaling coefficient based on the estimated range of motion and a distance between the end effector of the robotic arm and the target object; and perform hand-eye calibration based on the at least one target scaling coefficient. For more details, please refer to the related description in FIG. 4.

Figure 2:
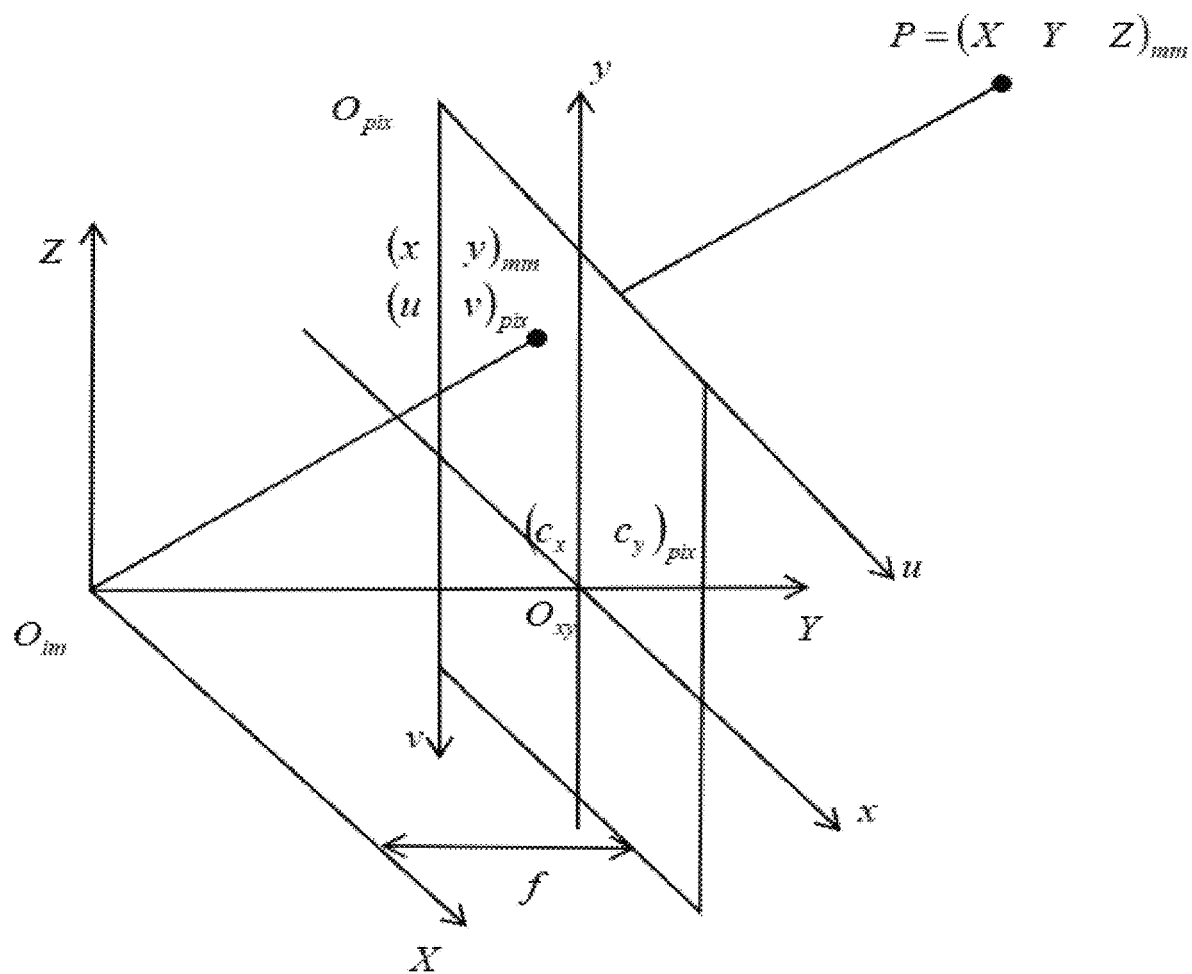
FIG. 2 is a schematic diagram of an exemplary pinhole camera model according to some embodiments of the present disclosure.

FIG. 2 is a schematic diagram of an exemplary pinhole camera model according to some embodiments of the present disclosure.

In some embodiments, as shown in FIG. 2, Step 1 may include: establishing a camera 3D coordinate system with a camera origin $O_{im}$ as a coordinate origin to represent a 3D coordinate of a point in space, using a physical length as the unit; establishing an image coordinate system with an image origin $O_{pix}$ as a coordinate origin to represent a pixel coordinate of a projection of the point in space on an imaging plane, using a pixel count as the unit; and establishing an imaging coordinate system with an imaging origin $O_{xy}$ as a coordinate origin to represent a two-dimensional (2D) coordinate of the projection of the point in space on the imaging plane, using the physical length as the unit. More descriptions of the camera 3D coordinate system, the image coordinate system, and the imaging coordinate system may be found in FIG. 1 and the related descriptions thereof.

In some embodiments, the processor may determine a physical coordinate of each point in the image coordinate system relative to the camera coordinate system in various manners based on an intrinsic parameter matrix of a depth camera with a known depth.

In some embodiments, since the 3D coordinate of a point in space and the 2D coordinates of the projection of a point in space on the imaging plane in the imaging coordinate system are both in physical length units, the processor may establish the following equation based on the principle of similar triangles:

$$\begin{cases} x = f\dfrac{X}{Z} \\ y = f\dfrac{Y}{Z} \end{cases}$$

wherein x and y collectively denote a coordinate of a spatial point P in the imaging coordinate system, X, Y, Z collectively denote a coordinate of the spatial point P in the camera 3D coordinate system, and $f$ denotes a focal length of the depth camera.

In some embodiments, in the image coordinate system and the imaging coordinate system, the projection of the point P may be transformed using the following equation:

$$\begin{cases} u = \alpha x + c_x \\ v = \beta y + c_y \end{cases}$$

wherein u and v collectively denote a coordinate of the projection of the spatial P in the image coordinate system, $\alpha$ and $\beta$ denote a count of pixels corresponding to a unit of physical length in an x direction and a count of pixels corresponding to a unit of physical length in a y direction, respectively, and $c_x$ and $c_y$ collectively denote a coordinate of the imaging origin $O_{xy}$ in the image coordinate system.

The above two equations are combined to obtain:

$$\begin{cases} u = \alpha f\dfrac{X}{Z} + c_x \\ v = \beta f\dfrac{Y}{Z} + c_y \end{cases}.$$

Let $\alpha f = f_x$, $\beta f = f_y$ then the combined equation is written in a matrix multiplication form:

$$\begin{bmatrix} u \\ v \\ 1 \end{bmatrix} = \frac{1}{Z}\begin{bmatrix} f_x & 0 & c_x \\ 0 & f_y & c_x \\ 0 & 0 & 1 \end{bmatrix}\begin{bmatrix} X \\ Y \\ Z \end{bmatrix} = \frac{1}{Z}KP$$

wherein K denotes the intrinsic parameter matrix of the depth camera; and the above equation is used to determine the physical coordinate of the each point in the image coordinate system with the known depth relative to the camera coordinate system, given that the intrinsic parameter matrix of the depth camera is known.

In some embodiments, in Step 2, a transformation relationship between links is represented using a DH model.

In some embodiments, the robot includes at least one robotic arm.

In some embodiments, each robotic arm includes a plurality of joints and a plurality of links.

A joint is a component that connects two adjacent links. In some embodiments, the joints may include rotational joints and translational joints.

In some embodiments, if the count of the joints is m, then the count of the links is m−1.

In some embodiments, the count of the joints and the count of the links may be set based on actual requirements.

In some embodiments, the modeling of the DH model follows the following rules: An origin of the coordinate system of a current joint is an intersection point of a common normal line of the current joint and a next joint with an axis of the current joint. If the current joint is the last joint, the origin is the intersection point of the common normal line of a previous joint and the current joint with the axis of the current joint. A Z-axis of the coordinate system of a current joint starts from the origin and coincides with the axis of the joint. An X-axis of the coordinate system of a current joint is the common normal line from the axis of the current joint to the axis of the next joint, perpendicular to both joint axes. When two Z-axes intersect, a direction of the X-axis is rotated so that an angle between the current Z-axis and the next Z-axis is positive and less than 180°.

In some embodiments, a motion relationship between adjacent links may be expressed as a link i rotating relative to a link i−1 around the Z-axis in a coordinate system n.

In some embodiments, n is a positive integer greater than or equal to 2.

In some embodiments, the value of n may be preset based on the actual requirements of the robotic arm.

In some embodiments, the DH model includes four parameters: d, a, $\alpha$, and $\theta$. The four parameters are specifically defined as follows:

$d_i$ denotes a link length, which is a distance between a joint m and a neighboring joint m−1 along the Z axis of the coordinate system n.

$a_{i-1}$ denotes a link offset, which is a distance between the Z axis of the coordinate system n and a Z axis of a coordinate system n−1 along an X axis of the coordinate system n−1.

$\alpha_{i-1}$ denotes a link twist angle, which is an angle between directions of the Z axes of the coordinate system n and the coordinate system n−1 along the X axis of the coordinate system n−1.

$\theta_i$ denotes a joint angle, which is an angle between a direction of an X axis of the coordinate system n and a direction of the X axis of the coordinate system n−1 along the Z axis of the coordinate system n.

In some embodiments, the transformation of neighboring links between coordinate systems is performed by: rotating the coordinate system n−1 around the X axis by $\alpha_{i-1}$; translating the coordinate system n−1 along the X axis by $\alpha_{i-1}$; rotating the coordinate system n−1 around the Z axis of the coordinate system n−1 by $\theta_i$; and translating the coordinate system n−1 around the Z axis of the coordinate system n−1 by di; and achieving complete overlap between the coordinate system n and the coordinate system n−1.

In some embodiments, the homogeneous transformation matrix from a joint i−1 to a joint i may be expressed using the parameters of the DH model as follows:

$$\begin{aligned}
{}_i^{i-1}T &= \text{Rot}(X, \alpha_{i-1}) \cdot \text{Tran}(X, a_{i-1}) \cdot \text{Rot}(Z, \theta_i) \cdot \text{Tran}(Z, d_i) \\
&= \begin{pmatrix} 1 & 0 & 0 & 0 \\ 0 & c\alpha_{i-1} & -s\alpha_{i-1} & 0 \\ 0 & s\alpha_{i-1} & c\alpha_{i-1} & 0 \\ 0 & 0 & 0 & 1 \end{pmatrix} \begin{pmatrix} 1 & 0 & 0 & a_{i-1} \\ 0 & 1 & 0 & 0 \\ 0 & 0 & 1 & 0 \\ 0 & 0 & 0 & 1 \end{pmatrix} \begin{pmatrix} c\theta_i & -s\theta_i & 0 & 0 \\ s\theta_i & c\theta_i & 0 & 0 \\ 0 & 0 & 1 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & d_i \\ 0 & 0 & 0 & 1 \end{pmatrix}, \\
&= \begin{pmatrix} c\theta_i & -s\theta_i & 0 & a_{i-1} \\ s\theta_i c\alpha_{i-1} & c\theta_i c\alpha_{i-1} & -s\alpha_{i-1} & -s\alpha_{i-1}d_i \\ s\theta_i s\alpha_{i-1} & c\theta_i s\alpha_{i-1} & c\alpha_{i-1} & c\alpha_{i-1}d_i \\ 0 & 0 & 0 & 1 \end{pmatrix}
\end{aligned}$$

wherein, ${}_i^{i-1}T$ denotes a transformation matrix from the joint i−1 to the joint i, $\text{Rot}(X, \alpha_{i-1})$ and $\text{Rot}(Z, \theta_i)$ represent rotation matrices, $\text{Tran}(X, a_{i-1})$ and $\text{Tran}(X, a_{i-1})$ represent translation matrices, $c\alpha_{i-1}$ and $c\theta_i$ represent cosine values of angles $\alpha_{i-1}$ and $\theta_i$, respectively, and $s\alpha_{i-1}$ and $s\theta_i$ represent sine values of the angles $\alpha_{i-1}$ and $\theta_i$, respectively.

The homogeneous transformation matrix is used to describe the transformation relationship of the links from a base coordinate system to an end coordinate system. In some embodiments, the homogeneous transformation matrix includes a rotation matrix and a translation matrix.

More descriptions of the base coordinate system may be found in FIG. 1 and the related descriptions thereof.

The end coordinate system refers to a moving coordinate system. In some embodiments, the end coordinate system may be the coordinate system located at the end effector of the robotic arm of the robot.

In some embodiments, assuming the robotic arm of the robot has N links, the transformation relationship from the base coordinate system to the end coordinate system may be represented by the following equation:

$${}_N^0 T = {}_1^0 T \cdot {}_2^1 T \ldots {}_N^{N-1} T$$

wherein the matrix ${}_N^0 T$ represents the transformation of the end coordinate system relative to the base coordinate system, and the matrix ${}_N^{N-1} T$ represents the transformation of an $N^{th}$ coordinate system relative to a $(N-1)^{th}$ coordinate system.

It may be understood that each joint of the robotic arm and its adjacent link have a coordinate system. The coordinate systems are sequentially numbered as 0, 1, 2, . . . , N, and the coordinate system corresponding to link N is referred to as coordinate system N.

In some embodiments, N is a positive integer.

In some embodiments, the value of N may be preset based on actual requirements.

In some embodiments, a target position of the robotic arm is represented by a homogeneous transformation matrix:

$$\begin{bmatrix} n_x & o_x & a_x & p_x \\ n_y & o_x & a_y & p_y \\ n_z & o_z & a_z & p_z \\ 0 & 0 & 0 & 1 \end{bmatrix}$$

In the matrix, an n-axis, an o-axis, and an a-axis represent three orthogonal axes describing an orientation part; $n_x$, $n_y$, $n_z$ denote components of a target orientation n-axis relative to the x, y, and z-axes of the base coordinate system; $o_x$, $o_y$, $o_z$ denote components of a target orientation o-axis relative to the x, y, and z-axes of the base coordinate system; $a_x$, $a_y$, $a_z$ denote components of a target orientation a-axis relative to the x, y, and z-axes of the base coordinate system; and $p_x$, $p_y$, $p_z$ denote components of a target position. The target orientation n-axis, o-axis, and a-axis represent directions of the n-axis, o-axis, and a-axis in a target coordinate system, respectively.

The target pose refers to a position and an orientation that the robotic arm of the robot is expected to reach. In some embodiments, the target pose includes an expected position and an expected orientation. For more details on the expected position and the expected orientation, refer to the related content in FIG. 1.

In some embodiments, by equating the homogeneous transformation matrix corresponding to the target pose of the end effector of the robotic arm to the transformation matrix of the end effector of the robotic arm relative to the base coordinate system of the robotic arm, a set of equations is constructed. Solving the set of equations yields the required joint angles to reach the target pose.

FIG. 3 is a schematic diagram illustrating coordinate systems and a transformation relationship for hand-eye calibration according to some embodiments of the present disclosure.

In some embodiments, as shown in FIG. 3, in step 3, the robotic arm is driven using a given set of known joint angles, an end effector $p_{base}^{tool}$ of the robotic arm is obtained using a kinematic model of the robotic arm, an axial difference $P_{tool}^{cal}$ of a checkerboard corner point at a specified position relative to the end effector of the robotic arm is manually measured, and $p_{base}^{tool}$ and $p_{tool}^{cal}$ are combined to obtain $P_{base}^{cal}$. The above operation is repeated to obtain a set of point cloud data relative to the base coordinate system of the robotic arm. The depth camera obtains a pixel coordinate of the checkerboard corner point at the specified position relative to the image coordinate system of the depth camera and a depth value of the checkerboard corner point relative to the camera coordinate system through corner detection. The pixel coordinate and the depth value are substituted into the pinhole camera model to obtain a 3D coordinate $P_{camera}^{cal}$ of the checkerboard corner point relative to the depth camera. The above operation is repeated to obtain a set of point clouds relative to the camera coordinate system, and depth values of all point cloud data collected by the depth camera are processed through a first-order Kalman filter. After the depth values measured by the camera are filtered and converged, complete point cloud data are calculated using an intrinsic parameter matrix of the depth camera. The above process is considered a successful point cloud acquisition.

The kinematic model of the robotic arm may also be referred to as the DH model. For more details on the DH model, refer to the related description in step 1 of FIG. 1.

The axial difference refers to a perpendicular distance of the checkerboard corner point relative to the end effector of the robotic arm along an axial direction of the robotic arm. The processor may calculate the coordinate $P_{base}^{cal}$ of the checkerboard corner point relative to the base coordinate system of the robotic arm based on the end effector $P_{base}^{tool}$ of the robotic arm and the axial difference $P_{tool}^{cal}$, using a preset algorithm. The preset algorithm may include a trigonometric function, or the like.

The specified position refers to at least one pre-determined position where the checkerboard is located. The specified position is a preset value and may be configured according to actual needs.

The checkerboard, also referred to as a calibration plate, refers to a plate-like structure with a grid-like pattern. The grid-like pattern may include multiple square grids of a same size.

The first-order Kalman filtering refers to a technique used for signal processing, which may be employed to filter noise from signals.

The intrinsic parameter matrix of the depth camera refers to internal parameters used by the depth camera for imaging. In some embodiments, the intrinsic parameter matrix of the depth camera is a preset value.

In some embodiments, in addition to manually measuring the axial difference of the checkerboard corner point at the specified position relative to the end effector of the robotic arm as described above, the end effector of the robotic arm is equipped with an infrared sensor. The infrared sensor is configured to measure the axial difference of the checkerboard corner point at the specified position relative to the end effector of the robotic arm. For more details, refer to the related description in FIG. 6.

In some embodiments of the present disclosure, in step 3, during the SVD process:

First, the two sets of point cloud data are decentralized using the following equations:

$$P_{camera}^{cal} = (x_1 \ x_2 \ \ldots \ x_n)$$

$$P_{base}^{cal} = (y_1 \ y_2 \ \ldots \ y_n)$$

$$\begin{cases} \bar{x} = \dfrac{x_1 + x_2 + \ldots + x_n}{n} \\ \bar{y} = \dfrac{y_1 + y_2 + \ldots + y_n}{n} \end{cases}$$

$$\begin{cases} X_i = x_i - \bar{x} \\ Y_i = y_i - \bar{y} \end{cases}$$

In the above equations, $x_i$ and $y_i$ represent a coordinate of the checkerboard corner point observed by the camera and a coordinate of the checkerboard corner point calculated relative to the base coordinate system of the robotic arm using forward kinematics and axial compensation, respectively. $x^-$ denotes an average of $x_i$ coordinates, $y^-$ denotes an average of $y_i$ coordinates, $X_i$ denotes decentralized point cloud data relative to the depth camera coordinate system, and $Y_i$ denotes decentralized point cloud relative to the base coordinate system of the robotic arm.

The normalized two sets of point clouds are used to construct a covariance matrix: $H=X^T*Y$. The covariance matrix is decomposed using SVD to a matrix U, a matrix S, and a matrix V: [U S V]=SVD(H).

Based on a decomposition result, a rotation matrix and a translation vector between the matrices are calculated:

$$[U \ S \ V] = SVD(H)$$

wherein R denotes the rotation matrix and t denotes the translation vector.

Considering that the depth measured by the depth camera at a relatively long distance may contain errors, and sensor errors are difficult to model and analyze, the present disclosure analyzes and compensates for the axial scaling of the camera depth. The depth value obtained by the depth camera is multiplied by a scaling coefficient, causing the point cloud data of the checkerboard corner point relative to the camera to change as follows:

$$P_{camera}^{cal'} = P_{camera}^{cal} * z\_scale$$

wherein z_scale denotes the scaling coefficient.

In some embodiments, after introducing the scaling coefficient, the point cloud data of the checkerboard corner point relative to the depth camera may be represented by the following equations. The point cloud data collected by the depth camera and a mean value of the point cloud data collected by the depth camera are all multiplied by the scaling coefficient.

$$P_{camera}^{cal'} = (x_1' \ x_2' \ \ldots \ x_n')$$

$$\begin{cases} \bar{x}' = \bar{x} * z\_scale \\ x_i' = x_i * z\_scale \end{cases}$$

$$X' = x_i' - \bar{x}' = (x_i - \bar{x}) * z\_scale = X * z\_scale$$

$$H' = (X * z\_scale)^T * Y$$

According to the properties of SVD decomposition, U and V remain unchanged, while S is scaled by a same factor as the covariance matrix:

$$[U \ S*z\_scale \ V] = SVD(H')$$

$$\begin{cases} R = V * U^T \\ t' = \bar{Y} - R\bar{X} * z\_scale \end{cases}$$

The depth scaling coefficient z_scale is optimized based on the calibration result. In the previous step of solving the calibration matrix, the depth scaling coefficient of the depth camera is considered, and an error function is defined with the scaling coefficient as an independent variable:

$$e(z\_scale) = P_{base}^{cal} - (R*P_{camera}^{cal'} + t'),$$

The coordinate of the checkerboard relative to the base coordinate system of the robotic arm is designated as a true value, and a calibration error is determined by subtracting a calculation result of a measured coordinate of the depth camera and the calibration result from the true value. The independent variable of the error function is taken as the depth scaling coefficient. In the present disclosure, the error function is combined with the function of the point cloud data of the checkerboard corner point relative to the camera, allowing a clear visualization of the relationship between the error function and the depth scaling coefficient:

$$e(z\_scale)=P_{base}^{cal}-(R*P_{camera}^{cal}*z\_scale+\overline{Y}-R*\overline{X}*z\_scale)$$

The result of the error function is a matrix of size 3×n, where each element is a function $f_i(z\_scale)$ of the depth scaling coefficient z_scale. However, a matrix of functions is not convenient for quantitatively comparing the magnitude of errors. Therefore, the present disclosure evaluates the error magnitude using the root mean square error (RMSE), calculated as follows:

$$rmse(z\_scale)=sum(e(z\_scale)*e(z\_scale))/n$$

The error function is multiplied element-wise with itself, resulting in a matrix of size 3×n. The sum operation sums all elements of the 3×n matrix to yield a scalar result, which is then divided by n to obtain the mean square error.

The magnitude of the error may be expressed as:

$$rmse(z\_scale) = sqrt\left(\frac{\sum_{i=1}^{3n} f_i(z\_scale)}{n}\right)$$

The optimization goal is to minimize the RMSE. However, the combined function calculation is not suitable for finding a minimum value using derivative techniques. Additionally, since the measurement error of the depth camera is related to the measurement distance, and the sampling points in the present disclosure are obtained at different positions of the calibration checkerboard, the error function may have multiple local minima under various depth sampling points, leading to a non-convex problem. Therefore, the present disclosure uses the Nelder-Mead optimization algorithm to search for the minimum value.

In the present disclosure, error optimization is performed using the Nelder-Mead algorithm through the following operations:

Let $z\_scale=x_i$, then $rmse(z\_scale)=f(x_i)$.

First, N additional initial points, denoted as $x_2, x_3, \ldots, x_{N+1}$, may be generated based on an initial point $x_1$, such that an $i^{th}$ component of $x_{1+1}$ is 5% larger than the corresponding component of $x_1$, while the other components remain unchanged. If the $i^{th}$ component of $x_1$ is zero, set the $i^{th}$ component of $x_{1+1}$ to 0.00025. After N+1 initial points have been generated, proceed with the following operations in a loop until a preset precision condition is met. The precision condition is predefined and may be adjusted according to practical requirements.

In S1, the points are re-ordered based on $f(x_i)$ in ascending order, such that $f(x_i)$ increases as i increases.

In S2, an average position of the first N points is calculated as $$m = \frac{1}{N}\sum_{i=1}^{N} x_i.$$

In S3, a reflection point of $x_{N+1}$ relative to point m is determined as $=2m-x_{N+1}$.

In S4, if $f(x_1) \le f(r) < f(x_N)$, set $x_{N+1}=r$ and proceed to a next iteration.

In S5, if $f(r)<f(x_1)$, compute AN expansion point as $s=m+2(m-x_{N+1})$. If $f(s)<f(r)$, set $x_{N+1}=s$ and proceed to the next iteration; otherwise, set $x_{N+1}=r$ and proceed to the next iteration.

In S6, if $f(x_N) \le f(r) < f(x_{N+1})$, compute $c_1=m+(r-m)/2$. If $f(c_1)<f(r)$, set $x_{N+1}=c_1$ and proceed to the next iteration; otherwise, proceed to operation S8.

In S7, if $f(x_{N+1}) \le f(r)$, compute $c_2=m+(x_{N+1}-m)/2$. If $f(c_2)<f(x_{N+1})$, Set $x_{N+1}=c_2$ and proceed to the next iteration; otherwise, proceed to the S8.

In S8, set $v_i=x_1+(x_i-x_1)/2$; (i=2 ... N+1), and assign $v_i$ to $x_i$. Then, proceed to the next iteration.

The loop continues until the optimal depth scaling coefficient is determined.

Figure 4:
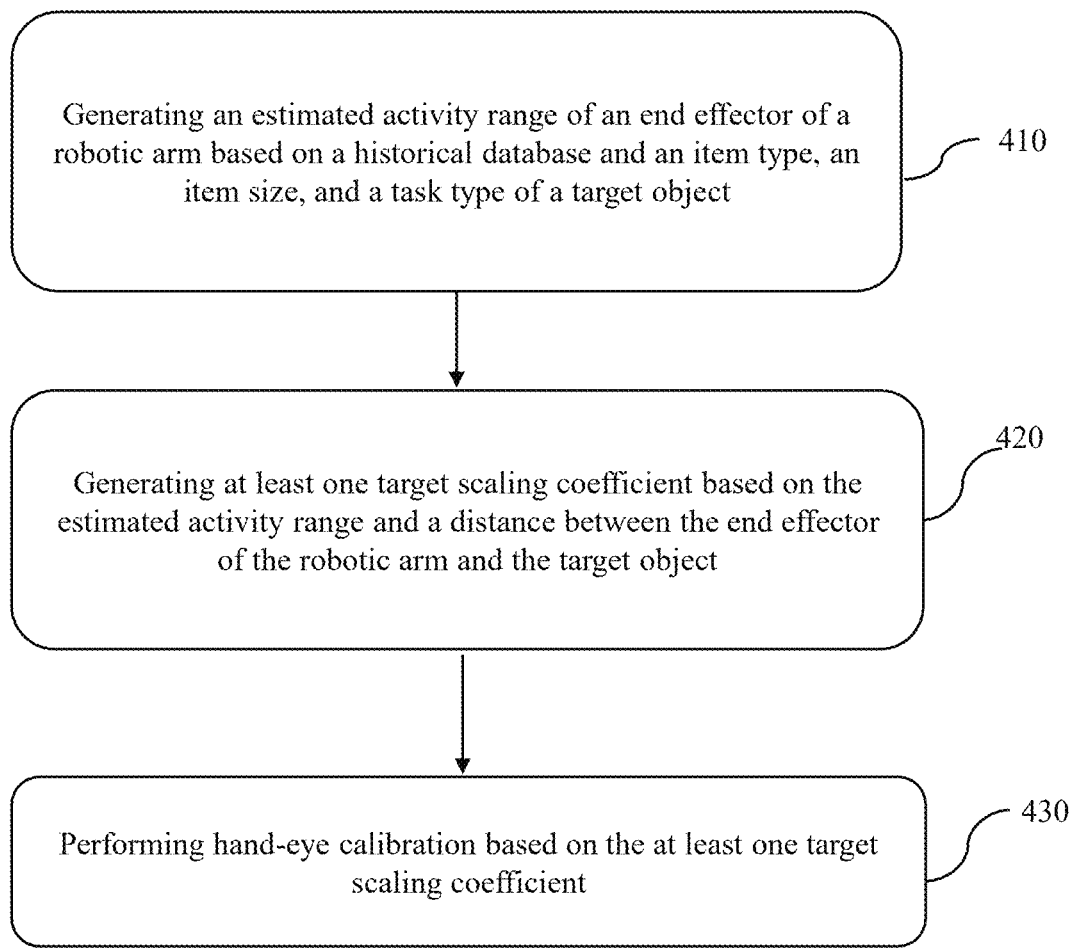
FIG. 4 is a flowchart of an exemplary process for hand-eye calibration based on a target scaling coefficient according to some embodiments of the present disclosure.

FIG. 4 is a flowchart of an exemplary process for hand-eye calibration based on a target scaling coefficient according to some embodiments of the present disclosure. As shown in FIG. 4, process 400 includes the following operations. In some embodiments, process 400 may be executed by a processor.

In some embodiments, the method for improved hand-eye calibration further includes: the processor generates an estimated activity range of an end effector of a robotic arm based on an item type, an item size, and a task type of a target object, as well as a historical database; generates at least one target scaling coefficient based on the estimated activity range and a distance between the end effector of the robotic arm and the target object; and performs hand-eye calibration based on the at least one target scaling coefficient.

In 410, generating an estimated activity range of an end effector of a robotic arm based on a historical database and an item type, an item size, and a task type of a target object.

The item type refers to data related to a shape of the target object. For example, the item type includes a regular shape, an irregular shape, or the like. The regular shape includes at least one of a spherical shape, a cuboidal shape, a cylindrical shape, etc. The irregular shape includes at least one of an irregular polyhedron, a composite body of multiple regular shapes, etc.

In some embodiments, the processor may acquire and identify an image of the target object using a capturing device to determine the item type of the target object. For example, the capturing device may include at least one of a camera, a depth camera, etc.

In some embodiments, the item size includes at least one of a length, a width, and a height of the target object.

The task type refers to a type of a task to be performed by a robot on the target object. For example, the task type includes at least one of positioning, grasping, transporting, welding, etc., performed by the robot on the target object.

In some embodiments, the processor may obtain the item size, the task type, etc., through various manners. For example, the processor may obtain the item size, the task type, etc., through manual input or retrieval from historical data.

The historical database includes historical activity data generated by a current robot during a historical time period.

The historical activity data refers to a plurality of historical motion trajectories of the robot during the execution of tasks in the historical time period. For example, the historical motion trajectories include trajectories of movement or rotation of at least one of at least one joint and at least one link of the robotic arm of the robot. In some embodiments, the historical activity data may be represented by a data sequence. The data sequence includes a sequence of coordinate values of at least one point on the robotic arm based on at least one of a base coordinate system and a camera coordinate system. A single task executed by the robot may include a plurality of historical motion trajectories.

In some embodiments, the processor may construct the historical database based on a plurality of pieces of historical activity data of the robot.

The estimated activity range refers to an anticipated range of motion of the end effector of the robotic arm when the robot is positioning, grasping, or transporting the target object. The estimated activity range may include a plurality of estimated motion trajectories of the end effector of the robotic arm and a maximum contour formed by a plurality of points on the motion trajectories.

An estimated motion trajectory refers to a motion trajectory of the end effector of the robotic arm within the estimated activity range, as predicted by the processor.

In some embodiments, the processor may determine the estimated activity range in various ways. For example, the processor may determine the estimated activity range based on cluster analysis.

In some embodiments, the cluster analysis includes: the processor clusters multiple cluster vectors and a to-be-determined vector to obtain multiple clusters, selects the cluster containing the to-be-determined vector from the multiple clusters, and determines a union of labels of all cluster vectors in the cluster containing the to-be-determined vector as a label of a target vector.

The to-be-determined vector refers to a vector constructed by the processor based on the item type, the item size, and the task type of the current target object corresponding to the robotic arm.

A cluster vector refers to a vector constructed by the processor based on historical item types, historical item sizes, and historical task types in the historical activity data corresponding to the current robot. The label of the cluster vector includes actual motion trajectories and an actual maximum contour of the end effector of the robotic arm in historical tasks corresponding to the current robot.

In some embodiments, the processor may determine the label of the to-be-determined vector as the estimated activity range of the robotic arm corresponding to the to-be-determined vector.

In 420, generating at least one target scaling coefficient based on the estimated activity range and a distance between the end effector of the robotic arm and the target object.

The distance between the end effector of the robotic arm and the target object refers to a distance between the end effector of the robotic arm at its initial position and a center of the target object. The distance between the end effector of the robotic arm and the target object may be obtained using a depth camera.

In some embodiments, the processor may generate the at least one target scaling coefficient in various ways based on the estimated activity range and the distance between the end effector of the robotic arm and the target object. For example, the processor may determine the at least one target scaling coefficient based on a first vector database.

The target scaling coefficient refers to the depth scaling coefficient that needs to be determined. By using the target scaling coefficient to adjust the depth of the depth camera, the depth camera and the end effector of the robotic arm can always remain within the estimated activity range, ensuring a control accuracy of the robotic arm when grasping the target object, or the like. For more details on the depth scaling coefficient, refer to the related description in step 3 of FIG. 1.

In some embodiments, the first vector database includes multiple first feature vectors. The processor constructs the first feature vectors based on historical activity ranges of multiple robots and the historical distances between ends of robotic arms of the robots and the target object in the historical data. The label corresponding to a first feature vector includes the corresponding historical depth scaling coefficient. The processor may determine a depth scaling coefficient with smallest subsequent error data in multiple historical tasks corresponding to the first feature vector and designate the depth scaling coefficient with the smallest subsequent error data as the label for the first feature vector. For more details on error data, refer to the related description in FIG. 6.

The processor may construct a first target vector based on the estimated activity range and the historical distance between the end effector of the robotic arm and the target object corresponding to the robot.

In some embodiments, the processor may determine a vector distance between the first target vector and each of the first feature vectors, identify at least one first feature vector with a similarity greater than a preset similarity threshold, and determine the label(s) corresponding to the at least one first feature vector as the at least one target scaling coefficient.

In some embodiments, the processor may determine the at least one target scaling coefficient through other manners, such as using a calibration model. For more details, refer to FIG. 5 and the related descriptions thereof.

In 430, performing hand-eye calibration based on the at least one target scaling coefficient.

For more details on how to perform the hand-eye calibration, refer to the related descriptions of step 4 in FIG. 1 and FIG. 3.

In some embodiments, after performing the hand-eye calibration, the robot may control the robotic arm to move to a preset position and a preset orientation, the target object, etc.

By obtaining the estimate activity range of the end effector of the robotic arm based on the historical data from the historical database, it is possible to pre-determine the potential range of motion of the end effector of the robotic arm and generate multiple target scaling coefficients. This enhances the flexibility and precision of controlling the end effector of the robotic arm, improves the accuracy of subsequent hand-eye calibration, enhances the processor's control precision over the robotic arm, and ultimately increases the operational accuracy of the robotic arm.

Figure 5:
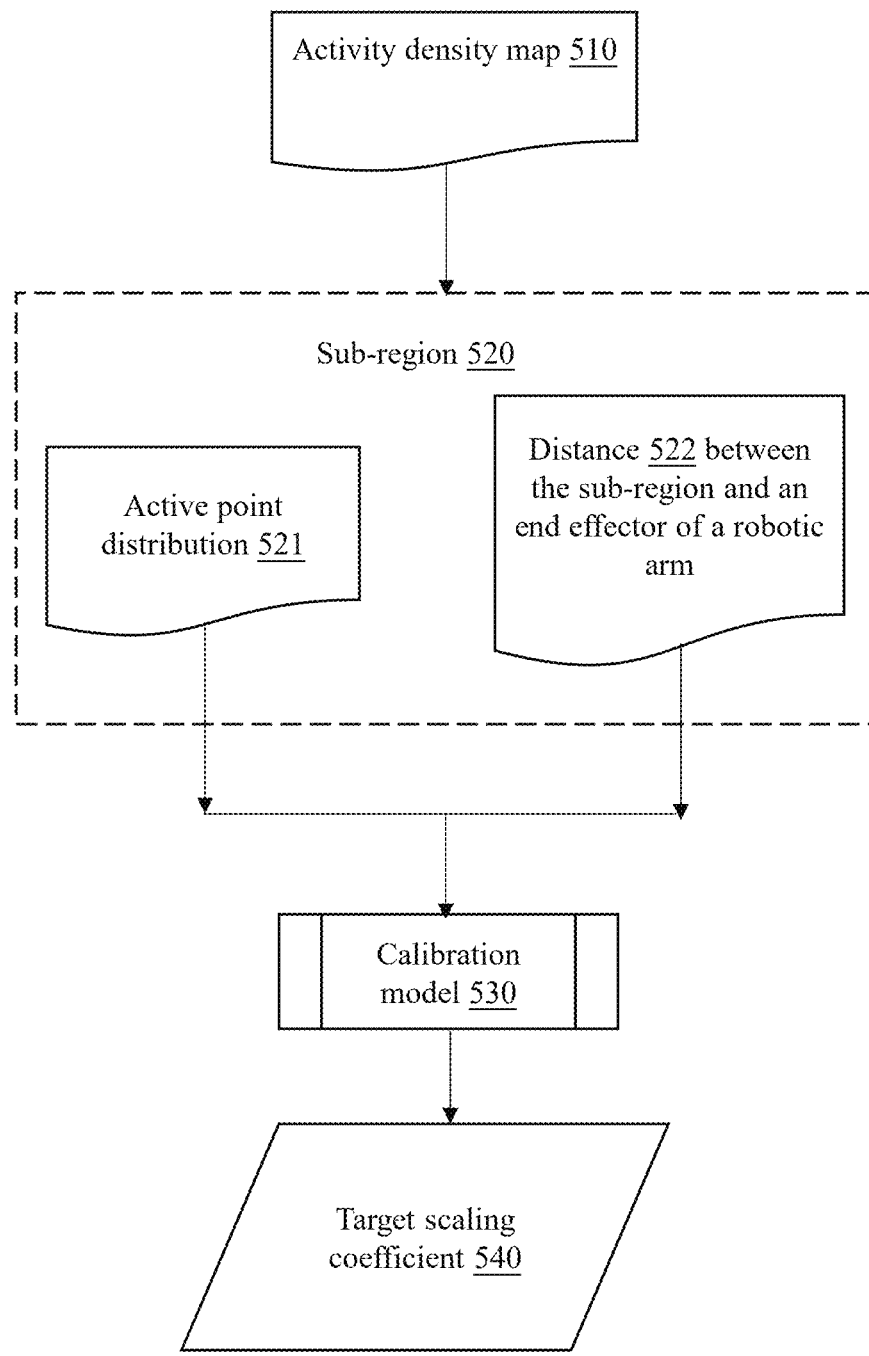
FIG. 5 is an exemplary schematic diagram illustrating the determination of a target scaling coefficient according to some embodiments of the present disclosure.

FIG. 5 is an exemplary schematic diagram illustrating the determination of a target scaling coefficient according to some embodiments of the present disclosure.

In some embodiments, an estimated activity range further includes a plurality of sub-regions. More descriptions of the estimated activity range may be found in FIG. 4 and the related descriptions thereof.

A sub-region refers to a region formed by dividing the estimated activity range.

In some embodiments, as shown in FIG. 5, the processor may generate a plurality of sub-regions 520 based on an activity density map 510 of an end effector of a robotic arm within the estimated activity range.

The activity density map 510 refers to a map formed by a plurality of points on estimated motion trajectories of the end effector of the robotic arm within the estimated activity range. The plurality of points refer to points uniformly distributed on a plurality of estimated motion trajectories of the end effector of the robotic arm. The plurality of points may include points distributed at time intervals or movement distance intervals. For more details on the estimated motion trajectory, refer to FIG. 4.

An activity density refers to a ratio of a count of points in the sub-region to an area of the sub-region.

In some embodiments, the processor may determine the plurality of sub-regions in various ways. For example, the processor may uniformly divide the estimated activity range into a plurality of units. If a difference between activity densities of two adjacent units does not exceed a preset difference threshold, the two units are merged into one unit until a standard deviation of the activity density of each unit exceeds a preset distribution threshold, or a count of merges reaches a preset count threshold. The processor may then determine the final formed units as the plurality of sub-regions.

The preset difference threshold, preset distribution threshold, and the preset count threshold are preset values, which may be set based on experience or actual needs.

In some embodiments, the processor may determine the preset distribution threshold based on a task type of a current task performed by the robot on a target object. For example, the processor may determine the preset distribution threshold corresponding to the task type by querying a first preset table. The first preset table includes task types and preset distribution thresholds corresponding to the task types. The processor may determine the first preset table in various ways, such as based on historical data, experience, actual needs, or a combination thereof.

Different task types result in different motion trajectories of the robotic arm, leading to different point densities and distributions in different regions. Therefore, it is necessary to set the preset distribution threshold according to the task type to make the divided sub-regions more reasonable and practical.

In some embodiments, as shown in FIG. 5, for each sub-region 520 among the plurality of sub-regions, the processor may determine a target scaling coefficient 540 of the sub-region 520 by using a calibration model 530 based on an activity point distribution 521 of the end effector of the robotic arm within the sub-region 520 and a distance 522 between the sub-region and the end effector of the robotic arm.

The calibration model refers to a model configured to determine the target scaling coefficient. In some embodiments, the calibration model is a machine learning model, such as a Deep Neural Network (DNN), a custom model structure, or the like, or any combination thereof.

The activity point distribution refers to a distribution of points where the end effector of the robotic arm has stayed within the sub-region.

The distance between the sub-region and the end effector of the robotic arm refers to a distance between a center of the sub-region and a current position of the end effector of the robotic arm. The current position refers to an initial position of the robotic arm before it starts executing a task. The distance between the center of the sub-region and the end effector of the robotic arm refers to a depth between the center of the sub-region and the end effector of the robotic arm. For more details on depth, refer to the related description in Step 1 of FIG. 1.

In some embodiments, the processor may obtain the distance between the sub-region and the end effector of the robotic arm in various ways, such as through manual input, historical data, a depth camera, or any combination thereof.

In some embodiments, the processor may train the calibration model using techniques such as gradient descent based on first training samples and first training labels.

In some embodiments, the first training samples may include historical activity point distributions and historical distances between sub-regions and the end effector of the robotic arm from historical data, and the first training labels include historical target scaling coefficients corresponding to the first training samples. In some embodiments, the first training samples and the first training labels may be obtained from historical data.

In some embodiments, the calibration model is trained as follows: a plurality of first training samples with first training labels are input into an initial calibration model, a loss function is constructed based on the first training labels and a prediction result of the initial calibration model, and the initial calibration model is iteratively updated based on the loss function. The training of the calibration model is completed when the loss function of the initial calibration model meets a preset condition. The preset condition includes convergence of the loss function, a count of iterations reaching a preset value, or the like.

In some embodiments, the calibration model includes a feature extraction layer and a coefficient determination layer.

In some embodiments, an input of the feature extraction layer includes the activity point distribution, and an output of the feature extraction layer includes a point distribution feature.

The point distribution feature refers to a distribution of remaining points after the points where the end effector of the robotic arm has stayed within the sub-region are filtered by the feature extraction layer.

In some embodiments, the feature extraction layer may filter the points where the end effector of the robotic arm has stayed within the sub-region based on a preset rule. For example, the preset rule may include random filtering. The preset rule may be set according to actual needs.

In some embodiments, the processor may train the feature extraction layer using techniques such as gradient descent based on second training samples and second training labels.

In some embodiments, the second training samples include a plurality of historical activity point distributions from a plurality of historical tasks of different robots in historical data, and the second training labels include historical point distribution features corresponding to the second training samples. In some embodiments, the processor may input the historical activity point distributions corresponding to the second training samples and historical point distribution features of the historical activity point distributions into the trained coefficient determination layer, respectively, to obtain target scaling coefficients corresponding to the historical activity point distributions and target scaling coefficients corresponding to the historical point distribution features. The processor may determine differences between the target scaling coefficients corresponding to the historical activity point distributions and the target scaling coefficients corresponding to the historical point distribution features. The processor may then use the historical point distribution feature corresponding to a smallest difference as the label for the historical activity point distribution, i.e., the second training label corresponding to the second training sample. The smallest difference indicates that points corresponding to the distribution feature include most of the effective information. For example, the points corresponding to the distribution feature include points on the motion trajectory of the robotic arm when it actually grasps the target object.

In some embodiments, the training process of the feature extraction layer is similar to the training process of the calibration model. For more details on the training process of the feature extraction layer, refer to the related description of training the calibration model.

In some embodiments, an input of the coefficient determination layer includes the point distribution feature and the distance between the sub-region and the end effector of the robotic arm, and an output of the coefficient determination layer includes the target scaling coefficient.

In some embodiments, the processor trains the coefficient determination layer using techniques such as gradient descent based on third training samples and third training labels corresponding to the third training samples.

In some embodiments, the third training samples include historical point distribution features and historical distances between sub-regions and the end effector of the robotic arm from a plurality of historical tasks of different robots in historical data. The third training labels include target scaling coefficients corresponding to the third training samples. In some embodiments, the processor may select a historical target scaling coefficient with smallest subsequent error data among the plurality of historical target scaling coefficients corresponding to the third training sample as the third training label of the third training sample.

In some embodiments, the training process of the coefficient determination layer is similar to the training process of the calibration model. For more details on the training process of the coefficient determination layer, refer to the related description of training the calibration model.

In some embodiments, the feature extraction layer and the coefficient determination layer may be obtained through joint training, and the output of the feature extraction layer may be used as the input of the coefficient determination layer.

In some embodiments, each set of sample data for the joint training includes a plurality of historical activity point distributions and historical distances between sub-regions and the end effector of the robotic arm. The label for each set of sample data is a historical target scaling coefficient. The historical activity point distributions are input into the feature extraction layer to obtain point distribution features output by the feature extraction layer. The point distribution features, along with the historical distances between the sub-regions and the end effector of the robotic arm, are input into the coefficient determination layer to obtain its output. A loss function is constructed based on the historical target scaling coefficients and the target scaling coefficients output by the coefficient determination layer, and parameters of the feature extraction layer and the coefficient determination layer are updated simultaneously. Through parameter updates, the trained feature extraction layer and coefficient determination layer are obtained.

Determining the target scaling coefficient based on the distance between the sub-regions and the end effector of the robotic arm allows for the determination of corresponding target scaling coefficients for different sub-regions, thereby improving the calibration accuracy of the end effector of the robotic arm within each sub-region. In addition, by differentiating the coefficients based on the activity density of the end effector of the robotic arm in each sub-region, relatively low-precision calibration can be applied to regions with less dense activity, avoiding waste of computational resources. Using the calibration model to determine a target depth scaling range enables automated determination of the target depth scaling range and improves the accuracy and efficiency of determining the target depth scaling range. Training the calibration model based on actual historical data enhances the output accuracy of the calibration model.

FIG. 6 is a flowchart of an exemplary process for performing hand-eye calibration based on adjusted point cloud data according to some embodiments of the present disclosure. As shown in FIG. 6, process 600 includes the following operations. Process 600 may be executed by a processor.

In 610, in response to the hand-eye calibration being completed, obtaining error data of a robotic arm during a task execution period via an image monitoring device.

The image monitoring device refers to a device that collects image data or video data, such as a camera, a sensor, etc., or any combination thereof.

In some embodiments, the image monitoring device is a depth camera.

In some embodiments, the image monitoring device may be mounted on the robotic arm.

In some embodiments, the image monitoring device may also be installed at any location according to practical needs.

The task execution period refers to an entire time span from the start of a task to the end of the task. See FIG. 4 for more description on task execution.

The error data refers to an error of the robotic arm in grasping a target object, e.g., a position error, a time error, etc.

In some embodiments, the error data may include an average distance between a plurality of grasping positions of an end effector of the robotic arm during the task execution period and a plurality of expected positions corresponding to the grasping positions.

More descriptions of the expected position may be found in FIG. 1 and the related descriptions thereof. More descriptions of the target object may be found in FIG. 4 and the related descriptions thereof.

In some embodiments, the processor may acquire the error data in a variety of ways via the image monitoring device. For example, the processor may capture image data of the end effector of the robotic arm and the target object it grasps via the image monitoring device; based on the image data, use a computer vision algorithm to identify and locate a plurality of grasping positions of the robotic arm; determine distances between the grasping positions and the expected positions, and determine an average distance between the grasping positions and the expected positions as the error data.

In 620, adjusting the value of n in n sets of point cloud data based on the error data, and issuing a recalibration instruction.

In some embodiments, the processor may adjust the value of n in the n sets of point cloud data based on the error data in various ways. For example, if the error data exceeds a preset error threshold, the processor may increase the value of n by a preset adjustment amount; if the error data is less than or equal to the preset error threshold, the processor may not adjust the value of n. The preset error threshold and the preset adjustment amount may be set based on historical experience.

The recalibration instruction refers to an instruction to control the robotic arm to perform hand-eye calibration again.

In some embodiments, the recalibration instruction may be configured to, based on an adjusted value of n, control an infrared sensor to reacquire point cloud data and obtain adjusted n sets of point cloud data; and perform hand-eye calibration based on the adjusted n sets of point cloud data.

In some embodiments, the end effector of the robotic arm is provided with an infrared sensor, which is configured to determine an axial difference of a checkerboard corner point at a specified position relative to the end effector of the robotic arm.

In some embodiments, the infrared sensor may acquire a 3D coordinate of the checkerboard corner point at the specified position and compare the 3D coordinate with a coordinate of the end effector of the robotic arm to determine the axial difference of the checkerboard corner point at the specified position relative to the end effector of the robotic arm.

More descriptions of acquiring the point cloud data may be found in FIG. 3 and the related descriptions thereof. More descriptions of the processor performing hand-eye calibration based on adjusted n sets of point cloud data may be found in FIGS. 1-3 and the related descriptions thereof.

By using the infrared sensor to measure the axial difference, the hand-eye calibration can be made more automated, and higher precision measurements can be achieved. By dynamically adjusting calibration parameters based on the error data and performing recalibration, the accuracy of the robotic arm's hand-eye calibration is further improved, thereby enhancing the precision of the robotic arm's task execution.

In some embodiments, the processor may acquire historical processing times of multiple historical hand-eye calibrations based on a historical database.

For more details on the historical database, refer to the related content in FIG. 4. In some embodiments, the historical database includes historical processing times of multiple historical hand-eye calibrations.

In some embodiments, the historical database may be configured based on manual settings.

In some embodiments, the processor may query the historical database to determine historical processing times of the multiple historical hand-eye calibrations.

A processing time refers to a total time required to complete the hand-eye calibration. In some embodiments, the processing time includes a time for acquiring point cloud data and a time for performing hand-eye calibration based on the point cloud data. A historical processing time refers to a processing time of a past hand-eye calibration.

In some embodiments, the processor may generate an n-value-processing time correlation curve based on the multiple historical processing times and historical n-values from the multiple historical hand-eye calibrations.

The n-value-processing time correlation curve is a curve that reflects a correlation between historical n-values and processing times.

In some embodiments, for each historical n-value, the processor constructs a data point (n, t) using the historical n-value and its corresponding historical processing time t. A set of data points $\{(n1, t1); (n2, t2); \ldots\}$ is sorted in ascending order according to a corresponding sampling density, and the set of data points is fitted to form the n-value-processing time correlation curve.

The sampling density refers to a frequency of occurrence of the data points.

In some embodiments, the fitting may be performed through various approaches. For example, the fitting may be performed using a fitting model, which may include linear regression fitting, polynomial regression fitting, etc. As another example, the fitting may be performed using a fitting algorithm, which may include a least squares technique, maximum likelihood estimation, etc.

In some embodiments, the processor may determine an estimated processing time corresponding to a current n-value based on the current n-value and the n-value-processing time correlation curve.

The estimated processing time refers to an expected time required to complete the calibration for the current n-value. In some embodiments, the processor may substitute the current n-value into the n-value-processing time correlation curve and use the processing time corresponding to the current n-value on the n-value-processing time correlation curve as the estimated processing time.

In some embodiments, the processor may adjust the value of n in the n sets of point cloud data based on the estimated processing time, the error data, parameters of a task to be executed, and the estimated activity range of the end effector of the robotic arm. The parameters of the task to be executed refer to various parameters related to the task to be performed.

In some embodiments, the task to be executed may include a task type and an importance level corresponding to the task type. The importance level may include a risk level of the task to be executed, a deformability level of a target object, or the like. In some embodiments, the importance level may be determined based on manual presets.

For more details on the task to be executed, the task type, estimated activity range, etc., refer to the related content in FIG. 4 above.

In some embodiments, the processor may adjust the value of n in the n sets of point cloud data in various ways based on the estimated processing time, the error data, the parameters of the task to be executed, and the estimated activity range of the end effector of the robotic arm.

In some embodiments, if the error data exceeds the preset error threshold, the processor may determine the preset adjustment amount based on the estimated processing time, the parameters of the task to be executed, and the estimated activity range by referencing a second preset table, and adjust the value of n based on the preset adjustment amount.

The second preset table is a correspondence table that maps historical estimated processing times, parameters of the task to be executed, and estimated activity ranges to preset adjustment amounts.

In some embodiments, the second preset table may be constructed based on historical data of a plurality of different robotic arms.

In some embodiments, the processor may use a clustering algorithm to cluster historical processing times, task types, importance levels, and estimated activity ranges from a plurality of different robotic arms, thus obtaining a plurality of clusters. The processor may designate each cluster as a row in the table and determine the preset adjustment amount for the row by selecting a historical preset adjustment amount that, when applied to the historical data in the cluster, minimizes a weighted sum of an actual processing time during calibration and actual error data from a subsequent task execution by the robotic arm.

In some embodiments, weight coefficients for the weighted sum of the actual processing time and the actual error data may be set based on historical experience.

By using the n-value-processing time correlation curve to adjust the value of n, a more accurate estimated processing time can be provided for the current calibration task, thereby reducing errors from manual estimation and improving the precision of hand-eye calibration.

In some embodiments, the processor may determine a distribution of n sets of point cloud data across a plurality of sub-regions based on a plurality of pieces of sub-error data of the sub-regions and distances between the sub-regions and the end effector of the robotic arm.

More descriptions of the sub-region may be found in FIG. 5 and the related descriptions thereof.

In some embodiments, the error data within a sub-region may include an average distance between a plurality of grasping positions within the sub-region and their corresponding expected positions.

More descriptions of the expected position may be found in FIG. 1 and the related descriptions thereof The distribution of n sets of point cloud data in the sub-regions refers to a distribution of the amount of point cloud data that needs to be collected in each sub-region.

In some embodiments, for each sub-region, the processor may obtain the amount of point cloud data that need to be collected within the sub-region by querying a second vector database.

The processor may determine the amount of point cloud data to be collected in a plurality of sub-regions as the distribution of n sets of point cloud data in the sub-regions, and determine a total amount of point cloud data to be collected across all sub-regions as the value of n.

The second vector database refers to a database that stores, indexes, and queries vectors.

In some embodiments, a second feature vector may be constructed based on historical error data from a plurality of historical sub-regions and historical distances between the sub-regions and the end effector of the robotic arm, collected when robotic arms of different robots executed multiple historical tasks.

In some embodiments, a label corresponding to the second feature vector may include an amount of point cloud data corresponding to the second feature vector. The processor may select an amount of point cloud data from the multiple historical tasks corresponding to the second feature vector that, after recalibration, resulted in a smallest weighted sum of the robotic arm's error data and processing time, and use the amount of point cloud data as the label corresponding to the second feature vector. Weight coefficients for the weighted sum of the robotic arm's error data and processing time may be set based on historical experience.

In some embodiments, the processor may construct a second target vector based on a plurality of pieces of sub-error data of a plurality of sub-regions and distances between the sub-regions and the end effector of the robotic arm.

In some embodiments, the processor may select a plurality of vectors with a similarity to the second feature vector greater than a similarity threshold, and determine an average of the labels corresponding to the plurality of vectors as the amount of point cloud data corresponding to the second target vector.

In some embodiments, the similarity may be determined through manners such as such as Euclidean distance, cosine similarity, or the like. The similarity threshold may be determined based on manual presets.

In some embodiments, the processor may control the infrared sensor to reacquire point cloud data in the plurality of sub-regions based on the distribution of the n sets of point cloud data.

In some embodiments, the processor may control the infrared sensor to reacquire point cloud data in a plurality of sub-regions in various ways.

For example, if the distribution of the n sets of point cloud data is less than a quantity threshold, the processor may control the infrared sensor to reacquire point cloud data in a plurality of sub-regions. The quantity threshold may be determined based on manual presets.

By optimizing the collection of point cloud data based on the error data and distance characteristics of a plurality of sub-regions, the collection of invalid point cloud data is reduced, and the accuracy and efficiency of point cloud data collection are improved, thereby providing a more efficient and precise calibration solution for the robotic arm during task execution.

Some embodiments of the present disclosure present a method for improved hand-eye calibration based on a structured light camera. The method includes:

Step 1: establishing a pinhole camera model, and using a depth camera to detect a three-dimensional (3D) coordinate to obtain a physical coordinate of each point in an image coordinate system with a known depth relative to a camera coordinate system.

Step 2: establishing a Denavit-Hartenberg (DH) model of a robotic arm, and moving the robotic arm to a determined coordinate using inverse kinematics.

Step 3: collecting n sets of point cloud data, applying depth scaling coefficients to the n sets of point cloud data to perform Singular Value Decomposition (SVD), and solving for an optimal depth scaling coefficient using a Nelder-Mead algorithm; wherein in the step 3, the robotic arm is driven using a given set of known joint angles, an end effector $P_{base}^{tool}$ of the robotic arm is obtained using a kinematic model of the robotic arm, an axial difference $P_{tool}^{cal}$ of a checkerboard corner point at a specified position relative to the end effector of the robotic arm is manually measured, and $P_{base}^{tool}$ and $P_{tool}^{cal}$ are combined to obtain $P_{base}^{cal}$; the above operation is repeated to obtain a set of point cloud data relative to a base coordinate system of the robotic arm; the depth camera obtains a pixel coordinate of the checkerboard corner point at the specified position relative to the image coordinate system of the depth camera and a depth value of the checkerboard corner point relative to the camera coordinate system through corner detection, the pixel coordinate and the depth value are substituted into the pinhole camera model to obtain a 3D coordinate $P_{camera}^{cal}$ of the checkerboard corner point relative to the depth camera; the above operation is repeated to obtain a set of point clouds relative to the camera coordinate system, depth values of all point cloud data collected by the depth camera are processed through a first-order Kalman filter, and after the depth values measured by the depth camera are filtered and converged, complete point cloud data are calculated using an intrinsic parameter matrix of the depth camera.

In some embodiments, in the step 3, the performing SVD includes: de-centering two sets of point cloud data, constructing a covariance matrix based on normalized two sets of point cloud data, decomposing the covariance matrix to obtain a matrix U, a matrix S, and a matrix V, and obtaining a calibration result by determining a rotation matrix R and a translation vector t based on a decomposition result.

In some embodiments, the method further includes: analyzing and compensating for axial scaling of a depth of the depth camera; multiplying the depth value obtained by the depth camera by a scaling coefficient, such that the point cloud data of the checkerboard corner point is changed relative to the camera; multiplying the point cloud data collected by the depth camera and a mean value of the point cloud data by the scaling coefficient, and according to properties of the SVD, U and V remain unchanged, and S is scaled by a same factor as the covariance matrix:

$$[U \quad S*z\_scale \quad V] = SVD(H')$$
$$\begin{cases} R = V*U^T \\ t' = \overline{Y} - R\overline{X}*z\_scale \end{cases}$$

In some embodiments, in the step 3, the depth scaling coefficient, denoted as z_scale, is optimized based on the calibration result, and an error function is defined using the scaling coefficient as an independent variable:

$$e(z\_scale) = P_{base}^{cal} - (R*P_{camera}^{cal'} + t')$$

In some embodiments, a coordinate of the calibration plate relative to the base coordinate system of the robotic arm is designated as a true value, a calibration error is determined by subtracting a calculation result of a measured coordinate of the depth camera and the calibration result from the true value, the independent variable of the error function is taken as the depth scaling coefficient and the above equations are combined to obtain an equation:

$$e(z\_scale) = P_{base}^{cal} - (R*P_{camera}^{cal}*z\_scale + \overline{Y} - R*\overline{X}*z\_scale)$$

A relationship between the error function and the depth scaling coefficient is determined based on the combined equation. A magnitude of an error is calculated, with an optimization objective being identifying a minimum value of the error. The Nelder-Mead algorithm is used to identify the minimum value and solving for an optimal depth scaling coefficient.

Step 4: completing the hand-eye calibration of the robotic arm based on the solved optimal depth scaling coefficient.

In some embodiments, the step 1 may include: establishing a camera 3D coordinate system with a camera origin $O_{im}$ as a coordinate origin to represent a 3D coordinate of a point in space, using a physical length as the unit; establishing the image coordinate system with an image origin $O_{pix}$ as a coordinate origin to represent a pixel coordinate of a projection of the point in space on an imaging plane, using a pixel count as the unit; and establishing an imaging coordinate system with an imaging origin $O_{xy}$ as a coordinate origin to represent a two-dimensional (2D) coordinate of the projection of the point in space on the imaging plane, using the physical length as the unit.

In some embodiments, in the step 2, the camera 3D coordinate system and the imaging coordinate system are represented using the physical length as the unit, and the following equation is established based on the principle of similar triangles:

$$\begin{cases} x = f\dfrac{X}{Z} \\ y = f\dfrac{Y}{Z} \end{cases}$$

wherein x and y collectively denote a coordinate of a spatial point P in the imaging coordinate system, and X, Y, Z collectively denote a coordinate of the spatial point P in the camera 3D coordinate system.

In the image coordinate system and the imaging coordinate system, a projection of the spatial point P is converted using the following equation:

$$\begin{cases} u = \alpha x + c_x \\ v = \beta y + c_y \end{cases}$$

wherein u and v collectively denote a coordinate of the projection of the point P in the image coordinate system, $\alpha$ and $\beta$ denote a count of pixels corresponding to a unit of physical length in an x direction and a count of pixels corresponding to a unit of physical length in a y direction, respectively, and $c_x$ and $c_y$ collectively denote a coordinate of the imaging origin $O_{xy}$ in the image coordinate system.

The above two equations are combined to obtain:

$$\begin{cases} u = \alpha f\dfrac{X}{Z} + c_x \\ v = \beta f\dfrac{Y}{Z} + c_y \end{cases}.$$

Let $\alpha f = f_x$, then the combined equation is written in a matrix multiplication form:

$$\begin{bmatrix} u \\ v \\ 1 \end{bmatrix} = \frac{1}{Z}\begin{bmatrix} f_x & 0 & c_x \\ 0 & f_y & c_x \\ 0 & 0 & 1 \end{bmatrix}\begin{bmatrix} X \\ Y \\ Z \end{bmatrix} = \frac{1}{Z}KP$$

wherein K denotes the intrinsic parameter matrix of the depth camera. The above equation is used to determine the physical coordinate of the each point in the image coordinate system with the known depth relative to the camera coordinate system, given that the intrinsic parameter matrix of the depth camera is known.

In some embodiments, in the step 2, a transformation relationship between links is represented using the DH model. A motion relationship between neighboring links is expressed as rotation of a link i around a Z axis in a coordinate system n relative to a link i-1. The DH model includes four parameters: d, a, $\alpha$, and $\theta$, which are defined as follows $d_i$ denotes a link length, which is a distance between a joint m and a neighboring joint m-1 along the Z axis of the coordinate system n.

$a_{i-1}$ denotes a link offset, which is a distance between the Z axis of the coordinate system n and a Z axis of a coordinate system n-1 along an X axis of the coordinate system n-1.

$\alpha_{i-1}$ denotes a link twist angle, which is an angle between directions of the Z axes of the coordinate system n and the coordinate system n-1 along the X axis of the coordinate system n-1.

$\theta_i$ denotes a joint angle, which is an angle between a direction of an X axis of the coordinate system n and a direction of the X axis of the coordinate system n-1 along the Z axis of the coordinate system n.

In some embodiments, the transformation of neighboring links between coordinate systems is performed by: rotating the coordinate system n-1 around the X axis by $\alpha_{i-1}$; translating the coordinate system n-1 along the X axis by $\alpha_{i-1}$; rotating the coordinate system n-1 around the Z axis of the coordinate system n-1 by $\theta_i$; and translating the coordinate system n-1 around the Z axis of the coordinate system n-1 by di; and achieving complete overlap between the coordinate system n and the coordinate system n-1. A homogeneous transformation matrix corresponding to a target pose is equal to a transformation matrix of the end effector of the robotic arm relative to the base coordinate system of the robotic arm. A set of equations is constructed, and the set of equations is solved to obtain a required joint angle to achieve the target pose.

In the present disclosure, Kalman filtering is used to ensure the stability of calibration data sampling. In the hand-eye calibration process based on a structured light camera, singular value decomposition (SVD) is used for preliminary calibration. To reduce noise and fluctuations during the calibration data sampling process, Kalman filtering is applied to smooth the data. This technique dynamically updates and corrects the calibration data, significantly improving data stability and accuracy, and avoiding the impact of unstable factors during the sampling process on the calibration result.

In the present disclosure, the depth scaling coefficient is introduced. After calibration is completed, the depth scaling coefficient is introduced to address systematic errors in the depth camera sensor. Sensor errors in depth cameras are often difficult to accurately describe using traditional modeling approaches. The present disclosure further refines the calibration result by adjusting the depth scaling coefficient to compensate for errors caused by sensor characteristics. The depth scaling coefficient can be dynamically adjusted, thereby improving the precision of the calibration result.

In the present disclosure, the Nelder-Mead optimization algorithm is used to determine the optimal depth scaling coefficient. To identify the optimal depth scaling coefficient, the Nelder-Mead optimization algorithm is applied to minimize the error function. The algorithm is a derivative-free direct search technique that iteratively converges to the minimum of the error function, thereby finding the optimal depth scaling coefficient. This process effectively reduces the impact of depth camera sensor errors on the calibration result, enhancing the overall accuracy and reliability of the calibration.

In the present disclosure, in view of the random errors inherent in the depth perception information acquired by active stereo vision technology sensors, a first-order Kalman filter is employed to rapidly stabilize and converge the data toward the true value. On the other hand, due to the multiple sources of error associated with structured light cameras and the challenges in constructing an accurate model, the error model is simplified into an expression incorporating a scaling coefficient for analysis. By integrating this expression into the singular value decomposition (SVD) process, the resulting errors are analyzed, and the optimal solution is derived through the application of the Nelder-Mead optimization algorithm.

The above descriptions are only preferred embodiments of the present disclosure. It should be noted that for those skilled in the art, without departing from the principles of the present disclosure, improvements and refinements can be made, and these improvements and refinements should also be considered within the scope of protection of the present disclosure. Structures, devices, and operational methods not specifically described and explained in the present disclosure shall be implemented according to conventional means in the field, unless otherwise stated or limited.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for improved hand-eye calibration based on a structured light camera, comprising:
   step 1: establishing a pinhole camera model, and using a depth camera to detect a three-dimensional (3D) coordinate to obtain a physical coordinate of each point in an image coordinate system with a known depth relative to a camera coordinate system;
   step 2: establishing a Denavit-Hartenberg (DH) model of a robotic arm, and moving the robotic arm to a determined coordinate using inverse kinematics;
   step 3: collecting n sets of point cloud data, applying depth scaling coefficients to the n sets of point cloud data to perform Singular Value Decomposition (SVD), and solving for an optimal depth scaling coefficient using a Nelder-Mead algorithm; wherein in the step 3, the robotic arm is driven using a given set of known joint angles, an end effector position $P_{base}^{tool}$ of the robotic arm is obtained using a kinematic model of the robotic arm, an axial difference $P_{tool}^{cal}$ of a checkerboard corner point at a specified position relative to the end effector of the robotic arm is manually measured, and $p_{base}^{tool}$ and $P_{tool}^{cal}$ are combined to obtain $P_{base}^{cal}$; the above operation is repeated to obtain a set of point cloud data relative to a base coordinate system of the robotic arm; the depth camera obtains a pixel coordinate of the checkerboard corner point at the specified position relative to the image coordinate system of the depth camera and a depth value of the checkerboard corner point relative to the camera coordinate system through corner detection, the pixel coordinate and the depth value are substituted into the pinhole camera model to obtain a 3D coordinate $P_{camera}^{cal}$ of the checkerboard corner point relative to the depth camera; the above operation is repeated to obtain a set of point clouds relative to the camera coordinate system, depth values of all point cloud data collected by the depth camera are processed through a first-order Kalman filter, and after the depth values measured by the depth camera are filtered and converged, complete point cloud data are calculated using an intrinsic parameter matrix of the depth camera;
   in the step 3, the performing SVD includes: de-centering two sets of point cloud data, constructing a covariance matrix based on normalized two sets of point cloud data, decomposing the covariance matrix to obtain a matrix U, a matrix S, and a matrix V, and obtaining a calibration result by determining a rotation matrix R and a translation vector t based on a decomposition result;
   analyzing and compensating for axial scaling of a depth of the depth camera; multiplying the depth value obtained by the depth camera by a scaling coefficient, such that the point cloud data of the checkerboard corner point is changed relative to the depth camera, multiplying the point cloud data collected by the depth camera and a mean value of the point cloud data by the scaling coefficient, and according to properties of the SVD, U and V remain unchanged, and S is scaled by a same factor as the covariance matrix:

$$[U \quad S*z\_scale \quad V] = SVD(H')$$

$$\begin{cases} R = V*U^T \\ t' = \overline{Y} - R\overline{X}*z\_scale \end{cases}$$

in the step 3, the depth scaling coefficient, denoted as z_scale, is optimized based on the calibration result, and an error function is defined using the scaling coefficient as an independent variable:

$$e(z\_scale) = P_{base}^{cal} - (R*P_{camera}^{cal} + t');$$

designating a coordinate of a calibration plate relative to the base coordinate system of the robotic arm as a true value, determining a calibration error by subtracting a calculation result of a measured coordinate of the depth camera and the calibration result from the true value, taking the independent variable of the error function as the depth scaling coefficient and combining the above equations to obtain an equation:

$$e(z\_scale) = P_{base}^{cal} - (R*P_{camera}^{cal}*z\_scale + \overline{Y} - R*\overline{X}*z\_scale)$$

determining a relationship between the error function and the depth scaling coefficient based on the combined equation, calculating a magnitude of an error, with an optimization objective being identifying a minimum value of the error; and using the Nelder-Mead algorithm to identify the minimum value and solving for the optimal depth scaling coefficient; and
   step 4: completing the hand-eye calibration of the robotic arm based on the solved optimal depth scaling coefficient.

2. The method for improved hand-eye calibration based on the structured light camera of claim 1, wherein the step 1 includes:
   establishing a camera 3D coordinate system with a camera origin $O_{im}$ as a coordinate origin to represent a 3D coordinate of a point in space, using a physical length as the unit;
   establishing the image coordinate system with an image origin $O_{pix}$ as a coordinate origin to represent a pixel coordinate of a projection of the point in space on an imaging plane, using a pixel count as the unit; and
   establishing an imaging coordinate system with an imaging origin $O_{xy}$ as a coordinate origin to represent a two-dimensional (2D) coordinate of the projection of the point in space on the imaging plane, using the physical length as the unit.

3. The method for improved hand-eye calibration based on the structured light camera of claim 2, wherein the camera 3D coordinate system and the imaging coordinate system are represented using the physical length as the unit, and the following equation is established based on the principle of similar triangles:

$$\begin{cases} x = f\dfrac{X}{Z} \\ y = f\dfrac{Y}{Z} \end{cases}$$

wherein x and y collectively denote a coordinate of a spatial point P in the imaging coordinate system, and X, Y, Z collectively denote a coordinate of the spatial point P in the camera 3D coordinate system;
   in the image coordinate system and the imaging coordinate system, a projection of the spatial point P is converted using the following equation:

$$\begin{cases} u = \alpha x + c_x \\ v = \beta y + c_y \end{cases}$$

wherein u and v collectively denote a coordinate of the projection of the spatial point P in the image coordinate system, α and β denote a count of pixels corresponding to a unit of physical length in an x direction and a count of pixels corresponding to a unit of physical length in a y direction, respectively, and $c_x$ and $c_y$ collectively denote a coordinate of the imaging origin $O_{xy}$ in the image coordinate system;

combining the above two equations to obtain:

$$\begin{cases} u = \alpha f \dfrac{X}{Z} + c_x \\ v = \beta f \dfrac{Y}{Z} + c_y \end{cases};$$

let $\alpha f = f_x$, $\beta f = f_y$ then the combined equation is written in a matrix multiplication form:

$$\begin{bmatrix} u \\ v \\ 1 \end{bmatrix} = \frac{1}{Z}\begin{bmatrix} f_x & 0 & c_x \\ 0 & f_y & c_x \\ 0 & 0 & 1 \end{bmatrix}\begin{bmatrix} X \\ Y \\ Z \end{bmatrix} = \frac{1}{Z}KP$$

wherein K denotes the intrinsic parameter matrix of the depth camera; and the above equation is used to determine the physical coordinate of the each point in the image coordinate system with the known depth relative to the camera coordinate system, given that the intrinsic parameter matrix of the depth camera is known.

4. The method for improved hand-eye calibration based on the structured light camera of claim 3, wherein in the step 2, a transformation relationship between links is represented using the DH model; a motion relationship between neighboring links is expressed as rotation of a link i around a Z axis in a coordinate system n relative to a link i−1; the DH model includes four parameters: d, a, α, and θ, which are defined as follows $d_i$ denotes a link length, which is a distance between a joint m and a neighboring joint m−1 along the Z axis of the coordinate system n;

$a_{i-1}$ denotes a link offset, which is a distance between the Z axis of the coordinate system n and a Z axis of a coordinate system n−1 along an X axis of the coordinate system n−1;

$\alpha_{i-1}$ denotes a link twist angle, which is an angle between directions of the Z axes of the coordinate system n and the coordinate system n−1 along the X axis of the coordinate system n−1; and $\theta_i$ denotes a joint angle, which is an angle between a direction of an X axis of the coordinate system n and a direction of the X axis of the coordinate system n−1 along the Z axis of the coordinate system n.

5. The method for improved hand-eye calibration based on the structured light camera of claim 4, wherein the transformation of neighboring links between coordinate systems is performed by:

rotating the coordinate system n−1 around the X axis by $\alpha_{i-1}$; translating the coordinate system n−1 along the X axis by $\alpha_{i-1}$; rotating the coordinate system n−1 around the Z axis of the coordinate system n−1 by $\theta_i$; and translating the coordinate system n−1 along the Z axis of the coordinate system n−1 by $d_i$; and achieving complete overlap between the coordinate system n and the coordinate system n−1; wherein a homogeneous transformation matrix corresponding to a target pose is equal to a transformation matrix of the end effector of the robotic arm relative to the base coordinate system of the robotic arm; and a set of equations is constructed, and the set of equations is solved to obtain a required joint angle to achieve the target pose.

* * * * *